United States Patent
Stewart et al.

(10) Patent No.: US 10,497,947 B2
(45) Date of Patent: Dec. 3, 2019

(54) SEAL FOR A FUEL CELL, AND FUEL CELL

(71) Applicant: Volkswagen AG, Wolfsburg (DE)

(72) Inventors: Ian Stewart, Vancouver (CA); Darcy McGowan, Vancouver (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 430 days.

(21) Appl. No.: 15/004,750

(22) Filed: Jan. 22, 2016

(65) Prior Publication Data

US 2016/0218378 A1  Jul. 28, 2016

(30) Foreign Application Priority Data

Jan. 23, 2015  (DE) .................. 10 2015 201 129

(51) Int. Cl.
| | | |
|---|---|---|
| *H01M 8/0276* | (2016.01) | |
| *H01M 8/0202* | (2016.01) | |
| *H01M 8/0273* | (2016.01) | |
| *H01M 8/0284* | (2016.01) | |
| *H01M 8/1018* | (2016.01) | |

(52) U.S. Cl.
CPC ....... *H01M 8/0276* (2013.01); *H01M 8/0273* (2013.01); *H01M 8/0284* (2013.01); *H01M 2008/1095* (2013.01)

(58) Field of Classification Search
CPC ............. H01M 8/0276; H01M 8/0273; H01M 8/0284; H01M 2008/1095
See application file for complete search history.

(56) References Cited

U.S. PATENT DOCUMENTS

| | | | |
|---|---|---|---|
| 7,592,088 B2 | 9/2009 | Rock et al. | |
| 7,740,988 B2 | 6/2010 | Ma et al. | |
| 8,986,860 B2 | 3/2015 | Vyas et al. | |
| 2005/0084734 A1* | 4/2005 | Kobayashi | H01M 8/0273 429/480 |
| 2009/0263702 A1* | 10/2009 | Vyas | H01M 8/0276 429/480 |
| 2010/0136456 A1* | 6/2010 | Sugawara | H01M 8/0276 429/479 |
| 2010/0243083 A1* | 9/2010 | Shereyk | B60H 1/249 137/527 |
| 2017/0125826 A1* | 5/2017 | Noponen | H01M 8/2425 |

FOREIGN PATENT DOCUMENTS

| | | |
|---|---|---|
| DE | 11 2005 002 035 | 6/2007 |
| DE | 102009017906 | 10/2009 |
| JP | 2005100950 | 4/2005 |
| JP | 2014229366 | 12/2014 |
| KR | 20080109056 | 12/2008 |

* cited by examiner

*Primary Examiner* — Muhammed S Siddiquee
(74) *Attorney, Agent, or Firm* — Davidson, Davidson & Kappel, LLC

(57) ABSTRACT

A seal (34) for a fuel cell (10), which includes multiple bipolar plates (13) and at least one membrane electrode assembly (12), the seal (34) having a seal body (40) surrounding a free inner chamber (42) is provided. It is provided that at least two flow barriers (46) pointing into the inner chamber (42) are formed as a single piece with the seal body (40), the flow barriers (46) being situated at a distance from the seal body (40) by at least one connecting element (48).

12 Claims, 4 Drawing Sheets

SEAL FOR A FUEL CELL, AND FUEL CELL

This claims the benefit of German Patent Application DE 10 2015 201 129.1, filed Jan. 23, 2015 which is hereby incorporated by reference herein.

The present invention relates to a seal for a fuel cell and to a fuel cell.

BACKGROUND

Fuel cells which include bipolar plates and a membrane electrode assembly situated therebetween have seals which are situated in a seal space around an active area of the fuel cell. Tolerances in the x and y directions as well as the dimensions of the compressed seal influence how wide the seal space is defined. The remaining space between the seal space and the compressed seal may define one or multiple bypass paths.

In the event that the seal is situated on the membrane electrode assembly, this bypass path may occupy a not inconsiderable portion. In some cases, as much as forty percent of the gas may flow via this bypass path. This problem may result, for example, in the fact that the stability decreases, a greater sensitivity at low stoichiometric ratios arises, the water management process deteriorates and/or the optimum operating conditions change.

On the bipolar plates in fuel cells, part of the gas, generally hydrogen and air, bypasses the active surface without participating in the reaction. These bypass paths reduce the pressure loss of the flow in the flow field.

DE 11 2005 002 035 T5 proposes a seal configuration, with the aid of which bypass areas are reduced. For this purpose, sub-seals are situated on both sides of a membrane electrode assembly, between the latter and adjacent bipolar plates. An elastomer sealing element, which spreads apart individual layers of the membrane electrode assembly, is provided within the membrane electrode assembly. A cross-sectional surface of the bypass is reduced by this spreading apart.

SUMMARY OF THE INVENTION

It is an object of the present invention to reduce the bypass flow in a fuel cell.

The present invention provides a seal for a fuel cell, which includes multiple bipolar plates and at least one membrane electrode assembly, the seal having a seal body surrounding a free inner chamber, includes at least two flow barriers pointing into the inner chamber, which are formed as a single piece with the seal body, the flow barrier being situated at a distance of at least one connecting element from the seal body.

This seal has the advantage that the flow barriers decrease the hydraulic cross section and thus reduce the bypass flow. The cross section of the bypass path may be reduced by more than 80 percent. Due to the fact that the flow barriers are largely independent of the actual seal, they have only a minimal influence on the compression or deformation of the seal when it is compressed. The distance of the flow barriers from the seal body thus permits an undisturbed compression or expansion of the seal body. In this design, a gap is present between the seal body, even in its expected expansion state, and the flow barriers. This gap prevents a hydraulic blockage from occurring. It is also advantageous that the seal body and the flow barriers may be manufactured in a single method or method step, for example using liquid injection molding (LIM). This advantageously permits low tolerances.

It may be provided that two flow barriers are situated centrally on longitudinal sides of the seal body. The flow barriers are ideally situated where bypass flows occur or where they are particularly intensive. The flow barriers reduce the hydraulic diameter in these locations.

It may be provided that at least four flow barriers are situated on longitudinal sides of the seal body. This advantageously increases redundancy, if individual flow barriers become damaged or are improperly formed. The danger of a hydraulic blockage is furthermore reduced.

The seal body and/or the flow barriers may be at least partially made from an elastomer, for example silicone. This has the advantage, among other things, that the production of the flow barriers may be integrated directly into the manufacturing process of the seal. Moreover, an elastomer, or silicone seal, meets all requirements and may compensate for manufacturing tolerances of the bipolar plates and/or tolerances in the formation of the plate stack.

The flow barriers may be more easily compressible than the seal body, for example they may be flatter or have a special design. The flow barriers thus do not impede the compression of the seal bodies, since the seal body is compressed first.

The flow barrier may include a base body, which faces the seal body, and at least one flat body, which is situated on the base body, the flat body being flatter than the base body. This design makes it possible for the base bodies of the flow barriers to be situated in the seal space, and for the flat bodies of the flow barriers to be situated in gaps between a bipolar plate and the membrane electrode assembly. The hydraulic cross section of the bypass path is thus substantially reduced. In addition, the flow barriers do not impede the compression of the seal bodies.

The flat body may include multiple raised ribs which point into the inner chamber. These ribs permit a good compression and expansion, which results in a better blocking effect.

The fuel cell according to the present invention, which includes two bipolar plates and a membrane electrode assembly situated therebetween, a sealing space for a seal, which surrounds an active area of the fuel cell, being provided between a bipolar plate and the membrane electrode assembly, includes a seal, which is described above and is situated in the seal space. The same advantages and modifications described above apply.

A seal may be situated on both sides of the membrane electrode assembly. The bypass channels on the upper side as well as on the underside of the membrane electrode assembly are thus advantageously reduced in terms of their hydraulic cross section.

The base bodies of the flow barriers may be situated in the seal space, and the flat bodies of the flow barriers may be situated in gaps between a bipolar plate and the membrane electrode assembly. This permits a substantial and targeted reduction in the hydraulic cross section not only in the seal space.

The heights of the seal body and the flow barriers are dimensioned in such a way that the inserted seal body and the inserted flow barriers are compressed between a bipolar plate and the membrane electrode assembly. This guarantees a good seal in the area of the flow barriers, so that the hydraulic cross section of the bypass path is efficiently reduced.

The compressed flow barriers may each be situated at a distance from the seal body. As a result, a gap which permits an undisturbed expansion of the seal body is present between the flow barriers and the seal body even in the compressed state.

The different specific embodiments of the present invention mentioned in this application may be advantageously combined with each other unless otherwise indicated in the individual case.

BRIEF DESCRIPTION OF THE DRAWINGS

The present invention is explained below in exemplary embodiments on the basis of the corresponding drawings.

DETAILED DESCRIPTION

Figure 1:
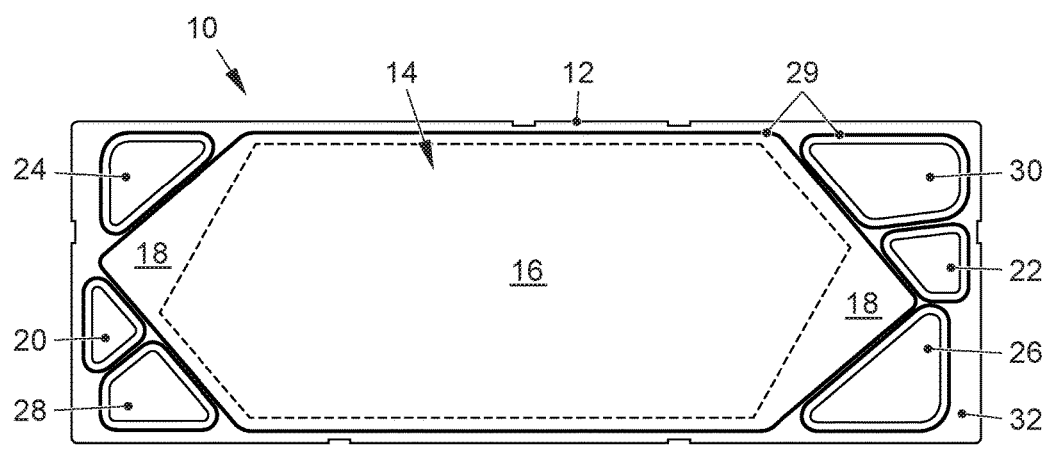
FIG. 1 shows a schematic top view of the membrane electrode assembly of a fuel cell.

FIG. 1 shows one part of a fuel cell 10. In particular, a membrane electrode assembly 12 is illustrated in a top view of one of its flat sides. Membrane electrode assembly 12 includes a catalytically coated membrane 14. In the illustrated example, catalytically coated membrane 14 has a hexagonal contour. An active area 16, which is indicated by a dashed line, is situated within this hexagonal contour. Outside active area 16, catalytically coated membrane 14 has inactive areas 18. Active area 16 is characterized in that, in the installed state of membrane electrode assembly 12 in a fuel cell stack, the fuel cell reactions take place in this area at the anode and cathode and thus generate electricity. Inactive areas 18, on the other hand, perform other functions, for example they supply the operating media to active area 16. Polymer electrolyte membrane 14 is ideally coated with catalytic coatings only in active area 16.

Membrane electrode assembly 12 includes various through-openings 20 through 30, which are used to supply and discharge the different operating media. Thus, a first anode port 20 is used to supply the anode operating gas to anodes of the fuel cell stack, and a diametrically opposed, second anode gas port 22 is used to discharge the anode operating gas. Likewise, a first cathode port 24 is used to supply a cathode operating gas to cathodes of the fuel cell stack, and a diametrically opposed, second cathode port 26 is used to discharge the cathode operating gas. Finally, a first coolant port 28 is used to supply a coolant to internal coolant channels of the bipolar plates, and a diametrically opposed, second coolant port 30 is used to discharge the coolant. The bipolar plates, which are not illustrated in detail, have an essentially identical blank as illustrated membrane electrode assembly 12, in particular corresponding ports. In this way, operating agent main channels, which penetrate the fuel cell stack in its stack direction, which faces outwardly from the plane of the page, are formed in the stacked state of membrane electrode assemblies 12 and the bipolar plates.

Anode and cathode ports 20 through 26 are fluid-conductively connected to corresponding anode and cathode channels of the bipolar plates via open distribution channels of the adjacent bipolar plates in the stack. Coolant ports 28 and 30 are connected to internal coolant channels of the bipolar plates. The distribution channel structures, which connect ports 20 through 30 and the anode and cathode channels of active area 16, run in inactive areas 18.

For the purpose of mechanical support, membrane 14 is usually enclosed on both sides by a supporting layer 32, which surrounds membrane 14 in its edge areas. Membrane 14 may also optionally extend over the entire surface of membrane electrode assembly 12 and be laminated with supporting layers 32 in its edge areas. Seals 34 are furthermore apparent in FIG. 2, which enclose operating agent through-openings 20 through 30 as well as catalytically coated membrane 14 for the purpose of sealing the latter to the outside. Seals 34 may be optionally situated on the bipolar plates instead of on membrane electrode assembly 12 or on both.

Figure 2:
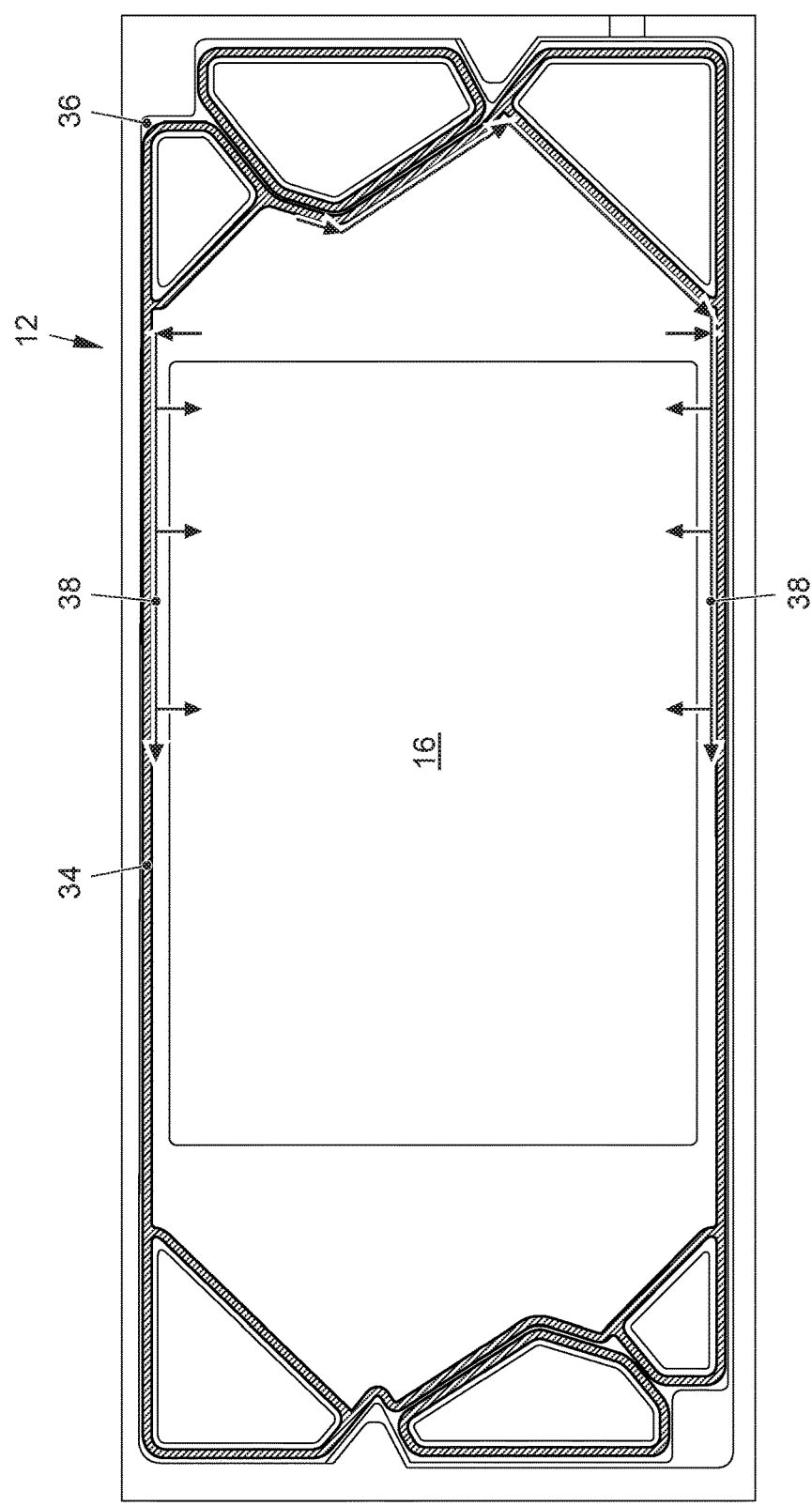
FIG. 2 shows an exemplary representation of bypath paths of the fuel cell.

FIG. 2 shows membrane electrode assembly 12 in a similar representation as FIG. 1. Seal 34 is situated in a seal space 36. Seal space 36 surrounds active area 16 of fuel cell 10. Seal space 36 is preferably formed in the bipolar plates. Since seal 34 does not completely fill seal space 36, for example due to manufacturing tolerances, bypass paths 38 arise, through which fluids flow instead of flowing through active area 16. Bypass paths 38 run on longitudinal sides of membrane electrode assembly 12 or fuel cell 10, from a lateral side toward the center.

Figure 3:
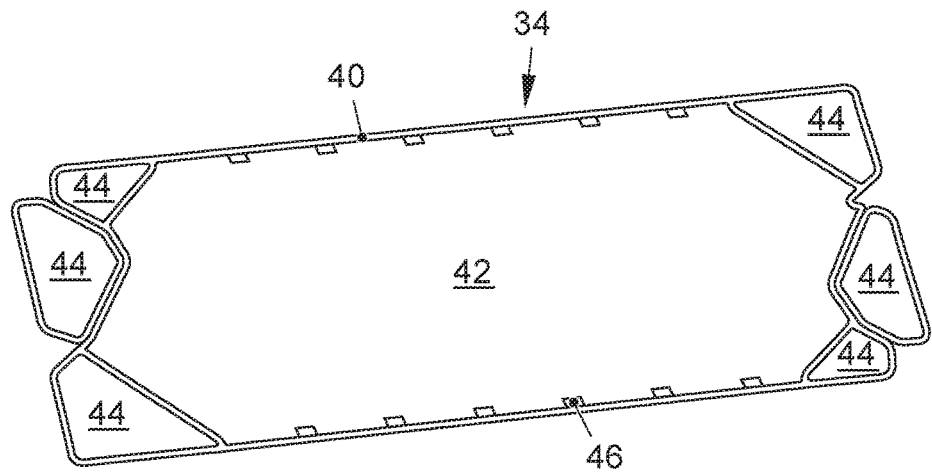
FIG. 3 shows a spatial representation of a seal for a fuel cell.

Seal 34 is illustrated in detail in FIG. 3. Seal 34 includes a seal body 40. Seal body 40 has an essentially rectangular shape, which corresponds to the shape of membrane electrode assembly 12. The exact contour of seal body 40 matches the contour of seal space 36. Seal body 40 surrounds a free inner chamber 42, whose dimensions essentially match the dimensions of membrane 14. Seal body 40 furthermore includes optional outer areas 44, which correspond to through-openings 20 through 30.

Flow barriers 46, which point or project into space 42, are situated on longitudinal sides of seal body 40. Twelve flow barriers 46 are provided, six on each longitudinal side of seal body 40. Flow barriers 46 are spaced equidistantly apart. Flow barriers 46 are formed as a single piece with seal body 40. For example, entire seal 34, i.e., seal body 40 and flow barriers 46, is manufactured in a common liquid injection molding operation or a liquid silicone processing method. Therefore, entire seal 34 is made of an elastomer, for example a silicone.

Flow barriers 46 form blockage bodies or elastomer barriers for the bypass channel or bypass path 38. Flow barriers 46 are formed perpendicularly to bypass path 38.

Figure 4:
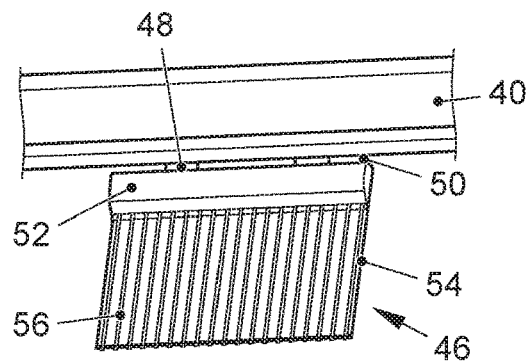
FIG. 4 shows a spatial representation of a first exemplary embodiment of a flow barrier.

FIG. 4 shows a detailed representation of a first exemplary embodiment of a flow barrier 46. Flow barrier 46 is fastened to seal body 40 with the aid of two connecting elements 48. Alternatively, a connecting element may be also provided which extends over the entire length of flow barrier 46 or only over one part of the length of flow barrier 46. It may furthermore be provided to provide more than two connecting elements. For example, three or four connecting elements may be provided. However, the number of connecting elements and their dimensions are preferably minimized for the purpose of preferably having little influence on the expansion behavior of seal body 40 during the compression of seal 34. For this reason, flow barrier 46 is situated at a distance from seal body 40 with the aid of connecting elements 48, so that a gap 50 is formed between seal body 40 and flow barrier 46. Gap 50 is dimensioned in such a way that seal body 40 is able to expand in the direction of inner chamber 42, i.e., in the direction of flow barrier 46, without impeding seal body 40 in its expansion. The gap is preferably present even when seal body 40 is expanded.

Flow barrier 46 includes a base body 52, which faces seal body 40, and a flat body 54, which is situated on base body 52. Connecting elements 48 are fastened to base body 52. Base body 52 is higher or thicker than flat body 54. Base body 52 is situated in seal space 36 in the installed state of seal 34, while flat body 54 is situated in a gap between a bipolar plate and membrane electrode assembly 12. Multiple ribs 56, which run in parallel and extend in the direction of inner chamber 42, are situated on flat body 54. In other words, ribs 56 run perpendicularly to the longitudinal extension of seal body 40. Ribs 56 improve the adaptation during compression and improve the tightness of flow barrier 46 as a blocking element in bypass path 38.

Figure 5:
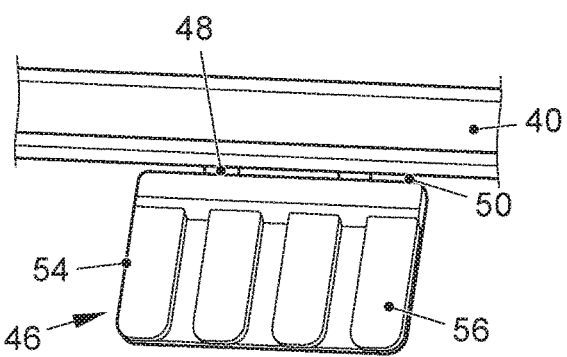
FIG. 5 shows a spatial representation of another exemplary embodiment of a flow barrier.

FIG. 5 shows another exemplary embodiment of flow barrier 46. Flow barrier 46 is also fastened to seal body 40 with the aid of connecting elements 48 in such a way that a gap 50 is defined between the two elements. Flat body 54 again includes raised ribs 56. In this exemplary embodiment, the number of ribs is significantly smaller compared to the exemplary embodiment from FIG. 4. In this case, four wider ribs 56 are provided. This detailed reduction shortens the manufacturing time. Wider ribs 56 also permit a stiffer flow barrier 46.

Figure 6:
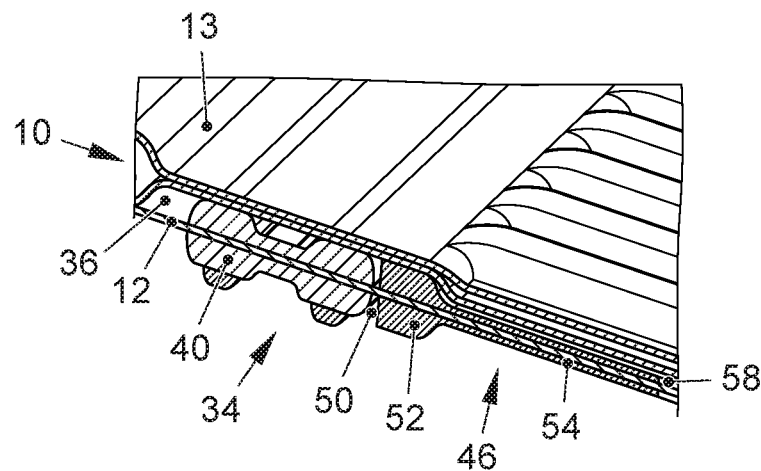
FIG. 6 shows a sectional representation of a compressed seal.

A cross section of an area of fuel cell 10 is illustrated by way of example in FIG. 6. A bipolar plate 13 is situated above membrane electrode assembly 12. Seal space 36 for accommodating seal 34 is formed in bipolar plate 13. Only one upper bipolar plate 13 is shown in FIG. 6, which is situated above membrane electrode assembly 12. Another, lower bipolar plate, which is not illustrated, is correspondingly provided below membrane electrode assembly 12. A first seal 34 is situated above membrane electrode assembly 12. Another, identical seal 34 is provided below membrane electrode assembly 12.

Seal body 40 of seal 34 is situated in seal space 36. Base body 32 of flow barrier 46 is also situated in seal space 36. In the compressed state of seal 34 illustrated in FIG. 6, gap 50 between seal body 40 and base body 52 is also present after the compression of the seal. Flat body 54 is situated in a gap 58 between bipolar plate 13 and membrane electrode assembly 12.

Figure 7:
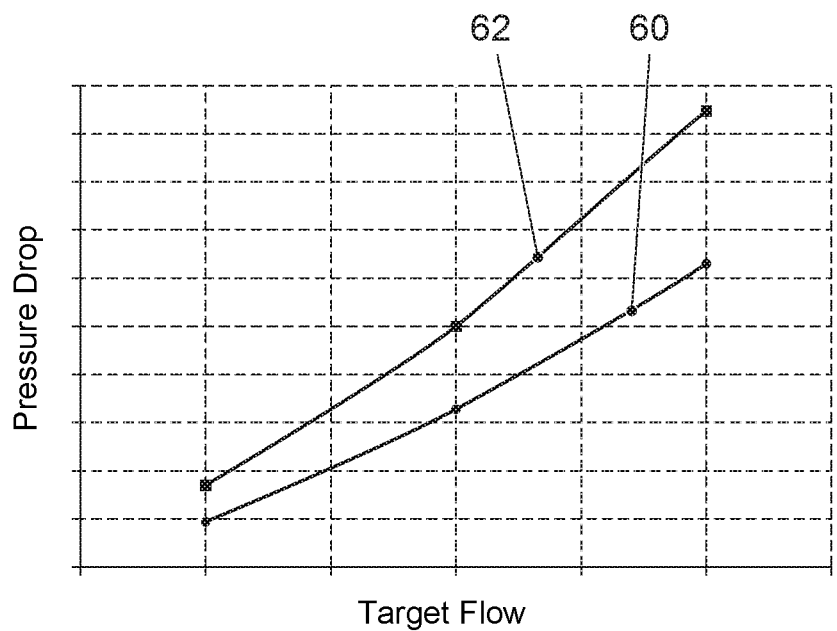
FIG. 7 shows a diagram representing curves of the anode pressure drop.

FIG. 7 shows a diagram, which illustrates the curves of the anode pressure drop for an individual fuel cell. In the diagram, the pressure drop at the anode is plotted in mbar across the target flow or gas volumetric flow in standard liters per minute (slpm). A first curve 60 shows the pressure drop of the fuel at the anode for a fuel cell without the flow barriers of the present invention. A second curve 62 shows the pressure drop of the fuel at the anode for a fuel cell, including the flow barriers of the present invention. A comparison of the two curves 60 and 62 shows a significant increase in the pressure drop, due to the flow barriers. Since the flow barriers block a significant part of the hydraulic cross section of the bypass paths, a larger share of the fuel must flow through the provided path of the active surface, which increases the pressure drop.

In a stoichiometric sensitivity test for a stack, which includes ten fuel cells without flow barriers, it has been shown that the standard deviation begins to rise at a stoichiometric ratio of less than a value X, which corresponds to an undesirable, increasing fluctuation in the power of the cells. Starting at a stoichiometric ratio of less than X—approx. 11%, the fluctuations are no longer acceptable; the measurement was therefore not continued. The anode pressure drop in mbar may be used as another parameter. The maximum pressure drop is approximately Y mbar. The pressure loss was also observed on the cathode side with values of just under Z mbar.

In a stoichiometric sensitivity test for a stack, which includes ten fuel cells with flow barriers according to the present invention, it has been shown that the standard deviation begins to rise only at a stoichiometric ratio of less than X—approx. 70%, which corresponds to an undesirable, increasing fluctuation in the power of the cells. Starting at a stoichiometric ratio of only less than X—approx. 18%, the fluctuations are no longer acceptable; the measurement was therefore not continued. The maximum pressure drop is now approximately Y—approx. 11.5 in mbar. The pressure loss on the cathode side has risen to Z—approx. 30%.

The maximum pressure drop at the anode has risen by 11.5%. The stability under high load at low stoichiometric ratios has also improved. This shows how effectively the flow barriers improve the operating parameters of the fuel cell according to the present invention.

LIST OF REFERENCE NUMERALS 10 fuel cell
12 membrane electrode assembly
13 bipolar plate
14 membrane
16 active area
18 inactive area
20 through-opening
22 through-opening
24 through-opening
26 through-opening
28 through-opening
30 through-opening
32 supporting layer
34 seal
36 seal space
38 bypass path
40 seal body
42 inner chamber
44 outer area
46 flow barrier
48 connecting element
50 gap
52 base body
54 flat body
56 ribs
58 gap
60 curve
62 curve

What is claimed is:

1. A seal for a fuel cell, the fuel cell including multiple bipolar plates and at least one membrane electrode assembly, the seal comprising:
a seal body surrounding a free inner chamber;
at least two flow barriers pointing into the inner chamber and formed as a single piece with the seal body, the flow barriers being situated at a distance from the seal body by at least one connecting element so as to create a gap between each of the flow barriers and the seal body, wherein the at least two flow barriers includes at least four flow barriers situated on longitudinal sides of the seal body.

2. The seal as recited in claim 1 wherein the flow barriers are more compressible than the seal body.

3. The seal as recited in claim 1 wherein the flow barrier includes a base body facing the seal body and at least one flat body situated on the base body, the flat body being flatter than the base body.

4. The seal as recited in claim 3 wherein the flat body includes multiple raised ribs pointing into the inner chamber.

5. A fuel cell comprising:
two bipolar plates;
a membrane electrode assembly situated between the two bipolar plates,
a seal space surrounding an active area of the fuel cell being provided between one of the bipolar plates and the membrane electrode assembly; and
the seal as recited in claim 1 situated in the seal space.

6. The fuel cell as recited in claim 5 wherein a further seal is situated on another side of the membrane electrode assembly.

7. The fuel cell as recited in claim 5 wherein base bodies of the flow barriers are situated in the seal space, and flat bodies of the flow barriers are situated in gaps between the one bipolar plate and the membrane electrode assembly.

8. The fuel cell as recited in claim 5 wherein heights of the seal body and the flow barriers are dimensioned in such a way that the inserted seal body and flow barriers are compressed between the one bipolar plate and the membrane electrode assembly.

9. The fuel cell as recited in claim 5 wherein at least one of the two bipolar plates and the membrane electrode assembly compress the seal body to define a compressed seal body state, the gap being present in the compressed seal body state.

10. The fuel cell as recited in claim 1 wherein each of the at least two flow barriers is connected by two of the at least one connecting element.

11. The fuel cell as recited in claim 1 wherein the seal body and the at least two flow barriers are formed as a single piece of silicone.

12. A method for assembling the fuel cell as recited in claim 5 comprising expanding the seal body in a direction of the inner chamber while maintaining the gap.

* * * * *